United States Patent
Vs et al.

(10) Patent No.: US 11,469,784 B2
(45) Date of Patent: Oct. 11, 2022

(54) SPUR ESTIMATING RECEIVER SYSTEM

(71) Applicant: TEXAS INSTRUMENTS INCORPORATED, Dallas, TX (US)

(72) Inventors: Aswath Vs, Kannur (IN); Sthanunathan Ramakrishnan, Bangalore (IN); Sriram Murali, Bangalore (IN); Sarma Sundareswara Gunturi, Bangalore (IN); Jaiganesh Balakrishnan, Bangalore (IN); Sashidharan Venkatraman, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 47 days.

(21) Appl. No.: 17/001,157

(22) Filed: Aug. 24, 2020

(65) Prior Publication Data
US 2021/0105034 A1  Apr. 8, 2021

(30) Foreign Application Priority Data
Oct. 3, 2019 (IN) .............................. 201941040005

(51) Int. Cl.
*H04B 1/10* (2006.01)
*H04B 1/16* (2006.01)

(52) U.S. Cl.
CPC ......... *H04B 1/1036* (2013.01); *H04B 1/1607* (2013.01); *H04B 2001/1054* (2013.01); *H04B 2001/1063* (2013.01)

(58) Field of Classification Search
CPC ................ H04B 1/1036; H04B 1/1607; H04B 2001/1054; H04B 2001/1063
See application file for complete search history.

(56) References Cited

U.S. PATENT DOCUMENTS

2009/0279591 A1* 11/2009 Filipovic .............. H04B 1/7107
375/148
2016/0294584 A1* 10/2016 Teplitsky ............. H04B 1/1027

* cited by examiner

*Primary Examiner* — Janice N Tieu
(74) *Attorney, Agent, or Firm* — John R. Pessetto; Charles A. Brill; Frank D. Cimino

(57) ABSTRACT

One example includes a receiver system. The receiver system includes an analog-to-digital converter (ADC) configured to convert an analog input signal into a digital output signal at a sampling frequency. The receiver system also includes a spur correction system configured to receive the digital output signal and to estimate spurs associated with the digital output signal and to selectively correct a subset of the spurs associated with a set of frequencies that are based on the sampling frequency.

19 Claims, 5 Drawing Sheets

SPUR ESTIMATING RECEIVER SYSTEM

RELATED APPLICATIONS

This application claims priority from India Provisional Application Serial No. 201941040005, filed 3 Oct. 2019, which is incorporated herein in its entirety.

TECHNICAL FIELD

This disclosure relates generally to electronic systems, and more specifically to a spur estimating receiver system.

BACKGROUND

Modern digital communication requires a sampling receiver to sample an analog signal, such as a radio frequency (RF) signal and convert the signal to a digital signal via an analog-to-digital converter (ADC). RF sampling transceivers are implemented in a variety of communications architectures, such as Wireless Infrastructure (WI), pulse-based RADAR systems, defense systems, and other types of communication systems. In a typical RF sampling transceiver, digital receiver chains typically operate at several phases of a high frequency clock signal (e.g., 3 gigabits per second or faster). As a result of the different phases of the high frequency clock signal, the digital signal can be provided as multiple parallel digital streams that are each associated with a different phase of the clock signal. Digital clock activity mismatch can result in clock-coupling spurs in the associated ADC at different frequency sub-bands associated with the digital signal. Systems with interleaved ADC cores can also experience such spurs due to potential mismatches in DC components added by the different ADC cores. The clocking spurs can be coupled to the receiver chain inputs and can degrade the resulting input signal. The spurs can also be time varying in nature, such that the amplitude and phase of the spurs may change over time.

SUMMARY

One example includes a receiver system. The receiver system includes an analog-to-digital converter (ADC) configured to convert an analog input signal into a digital output signal at a sampling frequency. The receiver system also includes a spur correction system configured to receive the digital output signal and to estimate spurs associated with the digital output signal and to selectively correct a subset of the spurs associated with a set of frequencies that are based on the sampling frequency.

Another example includes a method for correcting spurs in a sequence of digital samples in a receiver system. The method includes converting an analog input signal into a digital output signal at a sampling frequency and generating a current spur estimate for each frequency of a set of frequencies associated with the digital output signal. The method also includes generating at least one spur correction estimate for a selected at least one frequency of the set of frequencies associated with the digital output signal. The method further includes correcting a respective at least one spur associated with each of the at least one frequency of the set of frequencies based on the respective at least one spur correction estimate.

Another example includes a receiver system. The receiver system includes an ADC configured to convert an analog input signal into a digital output signal at each of a sequence of samples based on a clock signal having a sampling frequency. The system also includes a spur correction system configured to provide a spur correction estimate to correct a spur associated with a given sample of the sequence of samples. The spur correction system includes a spur estimator configured to generate a current spur estimate at each frequency of the set of frequencies and a spur estimate filter configured to generate the spur correction estimate for each of at least one of the set of frequencies, the spur estimate filter being further configured to correct a respective at least one spur associated with the digital output signal based on the respective spur correction estimate. The spur correction system also includes a signal detector configured to determine whether a signal is present among the subset of the set of frequencies. The spur correction system further includes a spur estimate selector configured to save the current spur estimate as a saved spur estimate when a signal is not detected among a block of consecutive samples and to set the spur correction estimate to the respective current spur estimate in response to the signal detector not detecting the presence of the signal among the subset of the set of frequencies, and to set the spur correction estimate to the saved spur estimate in response to the signal detector detecting the presence of the signal among the subset of the set of frequencies.

DETAILED DESCRIPTION

Figure 1:
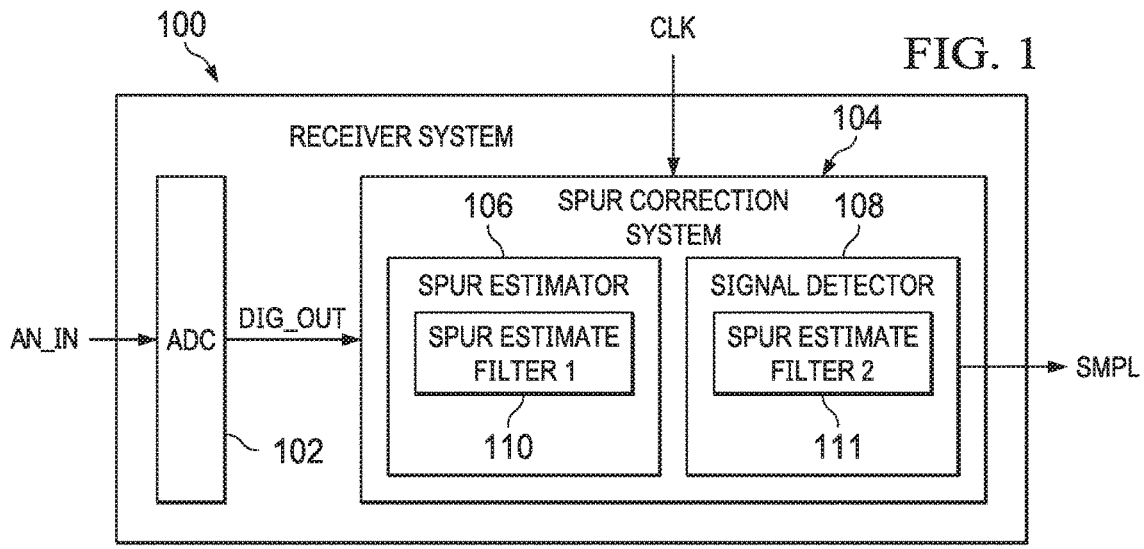
FIG. 1 illustrates an example of a spur-estimating receiver.

This disclosure relates generally to electronic systems, and more specifically to a spur-estimating receiver system. The receiver system can be implemented in any of a variety of digital communication systems in which analog signals (e.g., communication signals) are received and converted to digital signals. As described herein, the term "receiver" is used throughout, but it is to be understood that the spur estimating receiver system is not limited to use in a receiver system, and that the principles described herein are equally applicable to the receiver portion of a transceiver system. The spur-estimating receiver system can include an analog-to-digital converter (ADC) that is configured to convert an analog input signal to a digital output signal at each of a sequence of samples based on a clock signal having a sampling frequency. As an example, the sampling frequency can be high frequency (e.g., 3 gigabits per second or higher), and the clock signal can have a lower frequency (e.g., 375 MHz or 750 MHz), such that the analog signal after conversion to digital is sent out as multiple parallel digital output signal streams at different phases of the lower rate clock signal.

Such a receiver system may be affected by spurs that couple to the input ports that receive the desired signal. These spurs typically have a fixed frequency with slow variation in amplitude and phase of the spur across time. Further, the high-rate ADC (e.g., operating at approximately 3 giga-samples per second (GSPS)) may be implemented using multiple component ADCs operating at a lower rate but at different phases to create an overall sampled data (e.g., at 3 GSPS). This can be realized, for example, using four component ADCs operating at four respective phases (e.g., of a 750 MHz clock) or by two component ADCs operating at two respective phases (e.g., of a 1.5 GHz clock). In this case, the direct current (DC) added by each of the component ADCs may be different thereby causing spurs, such as at 0, fs/4, and fs/2 in the example of four component ADCs, or spurs at 0 and fs/2 in the example of two component ADCs. Therefore, spurs can be located at kfs/N, where k=0, 1, . . . N/2, where N is the number of parallel streams or the number of component interleaved ADCs. The spurs that couple into the received signal can therefore cause undesirable effects in the receiver system. However, it may not be necessary to remove all of spurs at all of the respective kfs/N locations (e.g., for all k values corresponding to an index of the component ADC) to mitigate undesirable effects. For example, due to the nature of the coupling, some spurs may be strong while others may be very weak. As another example, some spurs may reside in the band of the received signal thereby affecting its reception while some spurs may reside outside of the band of the received signal.

The receiver system includes a spur correction system configured to receive the digital output signal and to provide spur correction estimates to correct the received spurs. As described herein, the term "spur correction" refers to removing a spur from a sample based on subtracting a spur correction estimate from a given digital sample that includes the spur. The spur correction system can include, for example, four component functions: basic spur estimation, filtering of spur estimates to correct only relevant spurs, signal-power detection that can detect if the spur estimates are affected by presence of signal, and a spur estimate selection state machine that can determine the final correction to be applied.

For example, a basic spur estimation module can compute spur estimates for all the spurs of interest for every sample. As an example, the receiver can implement a parallelized digital implementation case, where each input signal stream can operate at different phases of the lower rate clock signal. Therefore, a set of N narrow-band filters generates estimates, all of which can be aggregated together to result in spur estimates at all kfs/N, k=0 . . . N/2.

A spur estimate filter can operate on the output of the basic spur estimation module and can filter the output such that only spurs of interest can be removed. In the case of the parallel implementation where the spurs are located at kfs/N, k=0 . . . N/2, the spur estimate filter can be realized using simple filters. For example, the filter can receive inputs from other streams and can filter each of the streams with data from other streams, so that spurs at the sub-bands of interest are passed and other spurs are suppressed. Therefore, the output of this spur estimate filter module can be used to correct spurs in the input signal in the relevant sub-bands of interest.

The spur correction system may additionally employ a signal detector that detects if signal is present around the frequency bands of interest. If signal presence is detected, then the spur estimate selector (e.g., via an associated state machine) can determine the spur correction to be performed. The signal detector may be implemented in many ways. For example, the spur correction system can include a signal detector that is configured to implement both narrow-band filtering and wide-band filtering to determine the presence of the signal. The spur correction system can also include a signal presence detector that is configured to subtract a narrow-band filter output from a wide-band filter output for each of the samples to generate a difference. In response to the power of the difference being greater than a predetermined threshold, the signal presence detector can determine that there is a signal present in the respective sample. Additionally, the signal presence detector can compare the narrow-band power level with the power of the current saved spur estimate, which is obtained when a signal is determined to be not present (or alternately relative to a power threshold), and can determine that there is a signal present if the narrow-band power level is greater than the saved spur estimate (or relative to the power threshold).

Additionally the narrow-band and wide-band filter outputs in the signal detector may be passed through (e.g., different instances of) spur estimate filters so that the narrow-band and wide-band powers or samples only reflect signal content in the sub-bands of interest. The output of these modified narrow and wide-band filters may be passed through processing, such as described previously, to detect signal presence.

The spur correction estimate can be equal to a current spur estimate associated with the respective given sample in response to not detecting the presence of the signal across the frequency band associated with the given sample. Therefore, in response to not detecting a signal across the frequency band in the respective given sample, the spur correction system can correct the given sample based on the estimated spur associated with the respective given sample itself. The spur correction estimate can also be set equal to a saved spur estimate corresponding to a spur estimate of a previous sample in which no signal was detected in response to the signal detector detecting the presence of the signal across the frequency band associated with the given sample.

As an example, the spur correction system can include a spur estimator state machine that is configured to operate in a first state in response to greater than or equal to a predetermined threshold of samples of a block of sequential samples being determined to include no signal and in a second state in response to less than the predetermined threshold of samples of the block of sequential samples being determined to include no signal. In the first state, the spur correction system can set the saved spur estimate equal to the current spur estimate associated with a respective current sample and can set the spur correction estimate to be equal to the current spur estimate associated with each respective given sample of a next subsequent block of sequential samples. In the second state, the spur correction system can set the spur correction estimate to be equal to the saved spur estimate for each respective given sample of a next subsequent block of sequential samples.

FIG. 1 illustrates an example of a spur-estimating receiver system 100. The spur-estimating receiver system 100 can be implemented in any of a variety of digital communication systems in which analog signals (e.g., communication signals) are received and converted to digital signals. For example, the spur-estimating receiver system 100 can be implemented in an RF feedback sampling transceiver.

The spur-estimating receiver system 100 includes an analog-to-digital converter (ADC) 102 that is configured to convert an analog input signal, demonstrated in the example of FIG. 1 as a signal "AN_IN", to a digital output signal, demonstrated in the example of FIG. 1 as a signal "DIG_OUT", at each of a sequence of samples based on a clock signal CLK having a sampling frequency. As an example, the sampling frequency can be high frequency (e.g., 3 gigabits per second or higher). Therefore, the analog input signal AN_IN can be sampled at multiple different phases of the clock signal CLK to provide for multiple parallel digital output signal streams DIG_OUT, as described in greater detail herein. The spur-estimating receiver system 100 can therefore provide spur correction for each of the parallel digital output signal streams DIG_OUT.

The spur-estimating receiver system 100 also includes a spur correction system 104 configured to receive the digital output signal DIG_OUT and to determine whether there is a signal present across a frequency band associated with a given sample of the sequence of samples. The spur correction system 104 can thus provide a spur correction estimate to correct a spur associated with the given sample based on whether there is a presence of or absence of a signal in the respective sample. The stream of corrected samples corresponding to the digital output signal DIG_OUT having been spur-corrected by the spur correction system 104 is demonstrated as being output from the spur correction system 104 as a signal "SMPL". For example, the stream of corrected samples SMPL can be a spur-corrected serial sample stream after parallelization and re-serialization by the spur correction system 104. In the example of FIG. 1, the spur correction system 104 includes a spur estimator 106 and a signal detector 108. The spur estimator 106 is configured to generate a current spur estimate for each respective sample of the digital output signal DIG_OUT. The current spur estimate thus corresponds to an estimated spur component of the instant respective sample that is evaluated by the spur estimator 106.

The signal detector 108 is configured to evaluate each of the samples in the digital output signal DIG_OUT to determine if there is a signal present around the subset of kfs/N bands of interest. Presence of signals around the kfs/N bands may be due to communication signals near the respective bands. For example, for fs=3 GHz, if there are signal bands near 3.75 GHz, then the signal bands can alias and fall at 750 MHz. The estimates of the spurs of the system at 750 MHz can be affected by the presence of the signals as the signals may degrade the quality of the estimate of the spur at 750 MHz. If uncorrected, the spur at 750 MHz can affect the reception of the signal band by the receiver and degrade performance of the receiver. As an example, the signal detector 108 can include a set of filters that are configured to provide filtering of a frequency band associated with each respective sample to determine the presence or absence of the signal in the respective sample. For example, the signal detector 108 can implement both narrow-band filtering and wide-band filtering of each sample of the digital output signal DIG_OUT to determine the presence of the signal. The signal detector 108 can thus subtract a narrow-band filter output sample from a wide-band filter output sample to generate a difference. Therefore, the signal detector 108 can compare the power of the sample difference with a predetermined threshold, such that the signal detector 108 can determine that there is a signal present in the respective sample in response to the power being greater than a predetermined threshold. Additionally, the signal detector 108 can compare the narrow-band power level with the current spur estimate of the respective sample (or alternately a power threshold), and can determine that there is a signal present if the narrow-band power level is greater than the current spur estimate (or the power threshold).

In response to not detecting the presence of the signal across the frequency band associated with the given sample, the spur correction system 104 can set the spur correction estimate equal to the current spur estimate associated with the respective given sample. Therefore, in response to not detecting the signal across the frequency band in the respective given sample, the spur correction system 104 can correct the given sample based on the estimated spur associated with the respective given sample itself. In response to detecting the presence of the signal across the frequency band associated with the given sample, the spur correction system 104 can set the spur correction estimate equal to a saved spur estimate corresponding to a spur estimate of a previous sample where the signal presence was not detected. Therefore, in response to not detecting the signal across the frequency band in the respective given sample, the spur correction system 104 can correct the given sample based on a spur estimate associated with a previous sample. As a result, the spur correction system 104 can correct the spur of the given sample that includes a signal while substantially mitigating distortion of the resulting signal.

In addition, in the example of FIG. 1, the spur estimator 106 includes a first spur estimate filter 110. The spur estimate filter 110 can facilitate selective operation on the output of the spur estimator 106 and can filter the output such that only spurs of interest can be removed. For example, in the case of the parallel implementation where the spurs are located at kfs/N, k=0 ... N/2, the spur estimate filter 110 can be realized using simple filters (e.g., finite impulse response (FIR) filters). For example, the spur estimate filter 110 can select a subset of the spur estimates output from parallel filters associated with the spur estimator 106 to selectively correct the subset of the spurs associated with the set of frequencies in response to a selection signal. For example, for N=8, if spur correction is selected for DC, for fs/4 and for fs/2, then the filter to be used can be expressed as $(1+z^{-4})/2$. Such a filter response can be expressed as unity at DC, fs/4, and for fs/2, and can be expressed as 0 at fs/8 and at 3fs/8, thereby effectively allowing only estimates at DC, fs/4, and fs/2. As another example, in a simple implementation, the output of this spur estimate filter 110 can be used to correct spurs in the digital output signal DIG_OUT.

In addition, in the example of FIG. 1, the signal detector 108 includes a second spur estimate filter 111. The spur estimate filter 111 can facilitate signal detection in only the desired sub-bands and can filter the narrow-band and wide-band outputs such that only signal bands of interest can be observed and power detected only in the desired sub-bands. For example, in the case of the parallel implementation where the spurs are located at kfs/N, k=0 ... N/2, the spur estimate filter 111 can be realized using simple filters (e.g., finite impulse response (FIR) filters). For example, two different instantiations of the spur estimate filter 111 can filter the narrow-band and wide-band signals separately. The output of the sub-band filtered narrow-band and wide-band signals are then used for power detection as before, where the difference in the sub-band filtered narrow-band sample and sub-band filtered wide-band sample is implemented as described previously. For example, for N=8, if spur correction is selected for DC, for fs/4, and for fs/2, then the filter to be used can be expressed as $(1+z^{-4})/2$. Such a filter response can be expressed as unity at DC, fs/4, and for fs/2, and can be expressed as 0 at fs/8 and at 3fs/8. The narrow-band and wide-band filter outputs when sent through two instantiations of the spur estimate filter, result in narrow-band and wide-band signals only around DC, fs/4, and fs/2. Signal detection on the two outputs can be determined by looking at the power of the difference between these two outputs if signals are present near DC, fs/4, or fs/2. As an example, if signals are present only near fs/8 or 3fs/8, then the output of both the filters will be approximately identical, thereby rendering the difference approximately zero to indicate that no signal presence is detected. Thus, the signal detector 108 interprets the estimates as valid since no signal is present near the spurs of interest at DC, fs/4, or fs/2.

As described in greater detail herein, the spur correction system 104 can operate as a state machine. For example, the spur correction system 104 can operate in a first state in response to greater than or equal to a predetermined threshold of samples of the block of sequential samples being determined to include no signal and in a second state in response to less than the predetermined threshold of samples of the block of sequential samples being determined to include no signal. Therefore, in the first state, the spur correction system 104 can set the saved spur estimate equal to the current spur estimate associated with a respective current sample and can set the spur correction estimate to be equal to the current spur estimate associated with each respective given sample of a next subsequent block of sequential samples. In the second state, the spur correction system 104 can set the spur correction estimate to be equal to the saved spur estimate for each respective given sample of a next subsequent block of sequential samples.

Figure 2:
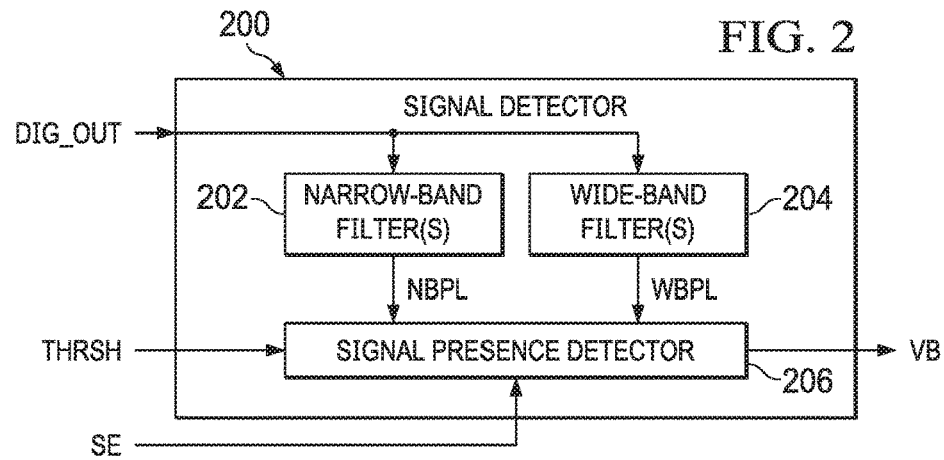
FIG. 2 illustrates an example of a signal detector.

FIG. 2 illustrates an example diagram of a signal detector 200. The signal detector 200 can correspond to the signal detector 108 in the example of FIG. 1. Therefore, reference is to be made to the example of FIG. 1 in the following description of the example of FIG. 2.

The signal detector 200 is demonstrated in the example of FIG. 2 as including at least one narrow-band filter 202 and at least one wide-band filter 204. The narrow-band filter(s) 202 and wide-band filter(s) 204 are each configured to input the digital output signal DIG_OUT. Therefore, each of the narrow-band filter(s) 202 and wide-band filter(s) 204 are configured to filter signals to only allow frequency bands around kfs/N, of the digital output signal DIG_OUT to determine the presence or absence of the signal around kfs/N bands in the respective sample. The narrow-band filter(s) 202 are configured to generate a narrow-band portion, demonstrated in the example of FIG. 2 as a signal "PN", corresponding to a filtered portion of the sample associated with narrow frequency-bands centered around kfs/N frequencies of the respective sample of the digital output signal DIG_OUT. Similarly, the wide-band filter(s) 204 are configured to generate a wide-band portion, demonstrated in the example of FIG. 2 as a signal "PW", corresponding to a filtered portion associated with moderately wide (e.g., wider than the narrow-band selected by the narrow-band filter) frequency-bands centered around kfs/N frequencies of the respective sample of the digital output signal DIG_OUT, with the frequency band being greater in width than the narrow-band associated with the narrow-band filter(s) 202. As an example, the narrow-band filter(s) 202 and the wide-band filter(s) 204 can be configured as any of a variety of types of filters, such as first-order infinite impulse response (IIR) filters operating on individual data streams with each operating at fs/N sampling rate. For example, an IIR filter of the form $\alpha z^{-N}/(1-(1-\alpha)z^{-N})$ with very small $\alpha$ operates as a filter having pass bands around kfs/N. The $\alpha$ are selected to be very small for the narrow-band filter and larger (but still relatively small in absolute terms) for the wide-band filters. The filters, when implemented on individual streams each operating at fs/N, can operate at $\alpha z^{-1}/(1-(1-\alpha)z^{-1})$, and thus as a simple first order IIR filter.

In the example of FIG. 2, the narrow-band portion PN and the wide-band portion PW are provided to a signal presence detector 206. The signal presence detector 206 can be configured to determine the presence or absence of a signal in the respective sample based on the narrow-band portion PN relative to the wide-band portion PW. For example, the signal presence detector 206 can be configured to sample the narrow-band portion PN and the wide-band portion PW, and can subtract the narrow-band portion PN sample from the wide-band portion PW sample to generate a difference sample. The signal presence detector 206 can thus compare the power of the difference sample with a predetermined threshold, demonstrated in the example of FIG. 2 as a signal "THRSH". In response to the power of the difference sample being greater than or equal to the predetermined threshold THRSH, the signal presence detector 206 can determine that there is a signal present in the respective sample. Alternatively, in response to the power of the difference sample being less than the predetermined threshold THRSH, the signal presence detector 206 can determine that there is no signal present in the respective sample.

Figure 3:
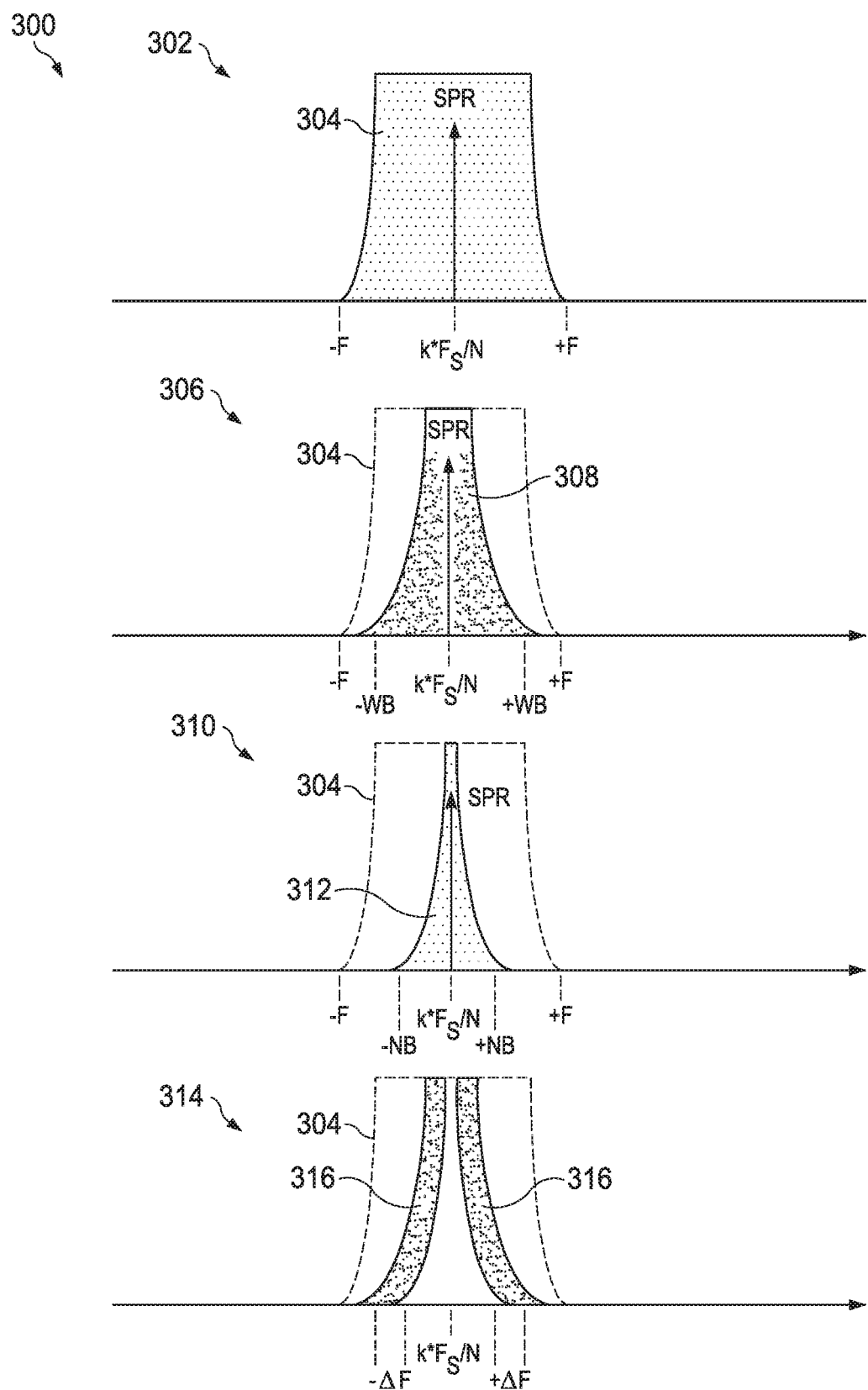
FIG. 3 illustrates an example diagram of signal presence detection.

FIG. 3 illustrates an example diagram 300 of signal presence detection. The diagram 300 demonstrates four different stages of processing for signal presence detection of the digital output signal DIG_OUT, that is associated with a frequency band that is centered at a frequency $k^*F_S/N$ that is associated with a frequency $F_S$ of the clock signal CLK. For example, "N" can correspond to a quantity of parallel sampling streams of the digital output signal DIG_OUT (e.g., associated with interleaved ADCs). Therefore, in the example of FIG. 3, the frequency band is defined as a frequency band centered at approximately the frequency $k^*F_S/N$ from approximately a frequency −F to approximately a frequency +F. While the frequency band in the example of FIG. 3 is demonstrated as being approximately symmetric about the frequency $k^*F_S/N$, it is to be understood that the frequency band can be non-uniform about the frequency $k^*F_S/N$.

The diagram 300 demonstrates a first stage 302 that demonstrates the frequency spectrum 304 of the digital output signal DIG_OUT, defined between the frequency −F and the frequency +F centered at the frequency $k^*F_S/N$. The frequency spectrum includes a spur component "SPR" that is located at the frequency $k^*F_S/N$. For example, the spur component SPR can have resulted from digital clock activity mismatch in the ADC 102 at different frequency sub-bands based on the N parallel sampling streams.

The diagram 300 also includes a second stage 306 that demonstrates the sample that is wide-band filtered by a respective wide-band filter 204. In the second stage 306, the sample is demonstrated as removing portions of the frequency spectrum 304 between the frequency −F and the frequency +F. The frequency spectrum includes the spur component "SPR" that is located at the frequency $k^*F_S/N$. In the example of FIG. 3, the respective wide-band filter 204 passes a portion of the frequency spectrum 304 between a frequency −WB and a frequency +WB to provide a wide-band portion 308, with the wide-band portion 308 being centered about the frequency $k^*F_S/N$. Therefore, the original bandwidth of the frequency spectrum 304 is demonstrated in the example of FIG. 3 as being outlined with a dotted line. The wide-band portion 308 in the second stage 306 can thus correspond to an output of the wide-band filter 204 between the frequency −WB and the frequency +WB corresponding to a wide-band power level.

The diagram 300 also includes a third stage 310 that demonstrates the sample that is narrow-band filtered by a respective narrow-band filter 202. In the third stage 310, the sample is demonstrated as removing portions of the frequency spectrum 304 between the frequency −F and the frequency +F. The frequency spectrum includes the spur component "SPR" that is located at the frequency $k^*F_S/N$. In the example of FIG. 3, the respective narrow-band filter 202 passes a portion of the frequency spectrum 304 between a frequency −NB and a frequency +NB to provide a narrow-band portion 312, with the narrow-band portion 312 being centered about the frequency k*$F_S$/N. The narrow-band portion 312 therefore has a narrower frequency band than the wide-band portion 308. The original bandwidth of the frequency spectrum 304 is demonstrated in the example of FIG. 3 as being outlined with a dotted line. The narrow-band portion 312 in the third stage 310 can thus correspond to an output of the narrow-band filter 202 between the frequency −NB and the frequency +NB.

The diagram 300 further includes a fourth stage 314 that demonstrates the sample corresponding to the narrow-band portion 312 subtracted from the sample corresponding to the wide-band portion 308. As described previously, the signal presence detector 206 is configured to subtract the narrow-band sample from the wide-band sample to obtain a difference. In the example of FIG. 3, the fourth stage 314 demonstrates the spectrum of the difference between the sample corresponding to the narrow-band portion 312 and the sample corresponding to the wide-band portion 308 corresponding to a difference sample 316. The difference sample 316 is demonstrated as including a first difference band −ΔF and a second difference band +ΔF that is approximately centered at the frequency k*$F_S$/N. As described previously, the signal presence detector 206 can compare a power of the difference sample 316 with the predetermined threshold THRSH. In response to the power of the difference sample 316 being greater than or equal to the predetermined threshold THRSH, the signal presence detector 206 can determine that there is a signal present in the respective digital output signal DIG_OUT around kfs/N. Alternatively, in response to the difference power level being less than the predetermined threshold THRSH, the signal presence detector 206 can determine that there is no signal present in the respective digital output signal DIG_OUT around kfs/N.

Referring back to the example of FIG. 2, the signal presence detector 206 receives a signal SE. As an example, the signal SE can correspond to the saved spur estimate that was determined to have no signal present or that which is not corrupted by the presence of the signal. The signal presence detector 206 can thus also compare the power of the narrow-band sample with the current spur estimate SE. As an example, a sudden narrow-band input signal can degrade the narrow-band sample output (the narrow-band sample output has the spur at fs/N+any signal present in a narrow-band around fs/N). If the power difference between the power of the narrow-band sample and the current spur estimate SE is high (e.g., greater than a second predetermined threshold), then the signal presence detector 206 can determine that a sudden narrow-band input signal is present given that the saved spur estimate SE typically does not change much over time (e.g., typically approximately −65 dBFs from sample-to-sample). Therefore, in response to determining that the difference between the power of the narrow-band sample and the current spur estimate SE is sufficiently high (e.g., greater than the second predetermined threshold), then the signal presence detector 206 can determine that there is a signal present in the respective digital output signal DIG_OUT. In this way, the signal presence detector 206 can provide an additional robustness to the determination of the presence of the signal in the respective sample given that an initial saved spur estimate is obtained when there is no actual signal present input (e.g., during power-up or calibration), and so is therefore accurate, and that further changes to the saved spur estimate occurs typically in the absence of a wide-band or narrow-band signal. As an example, the saved spur estimate can be equal to the estimate during initial or power-up calibration when there is no input, and hence serves as a reasonable reference. Also, instead of comparing the power of the narrow-band filter output sample with the saved power of the spur estimate, the power of the difference between narrow-band filter output and the saved spur estimate can be computed.

In response to the determination of no signal being present in the respective sample, the signal presence detector 206 can be configured to provide a first state of a validation signal, demonstrated in the example of FIG. 2 as a signal "VB". For example, the signal presence detector 206 can assert the validation signal VB to indicate that the respective sample does not include a signal, and therefore is a valid sample for correcting the spur using the current spur estimate. Additionally, in response to the determination of a signal being present in the respective sample, the signal presence detector 206 can be configured to provide a second state of the validation signal VB. Therefore, as an example, the signal presence detector 206 can de-assert the validation signal VB to indicate that the respective sample includes a signal, and therefore is not a valid sample for correcting the spur using the current spur estimate. As a result, the spur correction system 104 can correct the spur of the respective sample based on the saved spur estimate.

Figure 4:
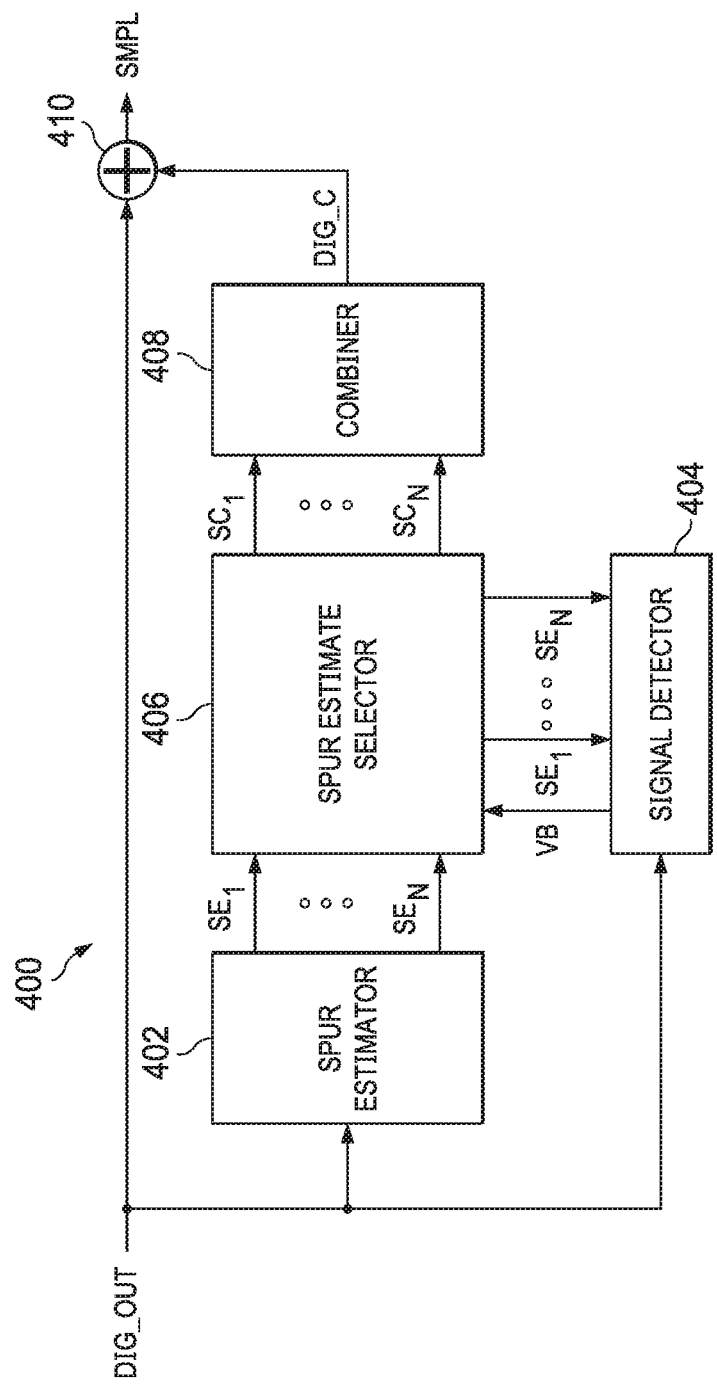
FIG. 4 illustrates an example of a spur correction system.

FIG. 4 illustrates an example of a spur correction system 400. The spur correction system 400 can correspond to the spur correction system 14 in the example of FIG. 1. Therefore, reference is to be made to the examples of FIGS. 1-3 in the following description of the example of FIG. 4.

As described previously, the spur correction system 400 is configured to receive the digital output signal DIG_OUT and to determine whether there is a signal present across a frequency band associated with a given sample of the sequence of samples. The spur correction system 400 can thus provide a spur correction estimate to correct a spur associated with the given sample based on whether there is a presence of or absence of a signal in the respective sample. In the example of FIG. 4, the stream of corrected samples corresponding to the digital output signal DIG_OUT having been spur-corrected by the spur correction system 400 is demonstrated as being output from the spur correction system 400 as a signal "SMPL".

In the example of FIG. 4, the spur correction system 400 includes a spur estimator 402. The spur estimator 402 is configured to parallelize the digital output signal DIG_OUT, demonstrated in the example of FIG. 4 as "N" parallel digital output signal streams, similar to as described previously in the example of FIG. 3. The spur estimator 402 is further configured to generate a current spur estimate for each respective sample of each of the parallel digital output signal streams. For example, the spur estimator 402 can include a parallel set of filters (e.g., IIR filters) that are each associated with a separate phase of the sampling frequency of the clock signal CLK. The output of the spur estimator 402 in all the parallel chains effectively obtains the spurs at all kfs/N (k=0, 1, ... N/2) frequency locations based on the individual low pass filters in each of the parallel chains, taken together, producing the estimates at all kfs/N collectively. This current spur estimate (the sequence of N values) thus corresponds to an estimated spur component of the current respective sample.

The spur correction system 400 also includes a signal detector 404 configured to evaluate each of the samples in each of the parallel digital output signal streams to determine if there is a signal present in the digital output signal DIG_OUT. Similar to as described previously, the signal detector 404 can include a set of filters that are configured to provide filtering of multiple frequency bands associated with the parallel digital signal streams to determine the presence or absence of the signal. For example, the signal detector 404 can implement both narrow-band filtering and wide-band filtering of each sample of each of the parallel digital output signal streams to determine the presence of the signal. The signal detector 404 can thus subtract a narrow-band sample from a wide-band sample with respect to each filtered sample to generate a set of N difference samples. Therefore, the signal detector 404 can compare the power of the set of difference samples with a predetermined threshold, such that the signal detector 404 can determine that there is a signal present in the respective sample in response to the power of the difference sample being greater than a predetermined threshold.

Figure 5:
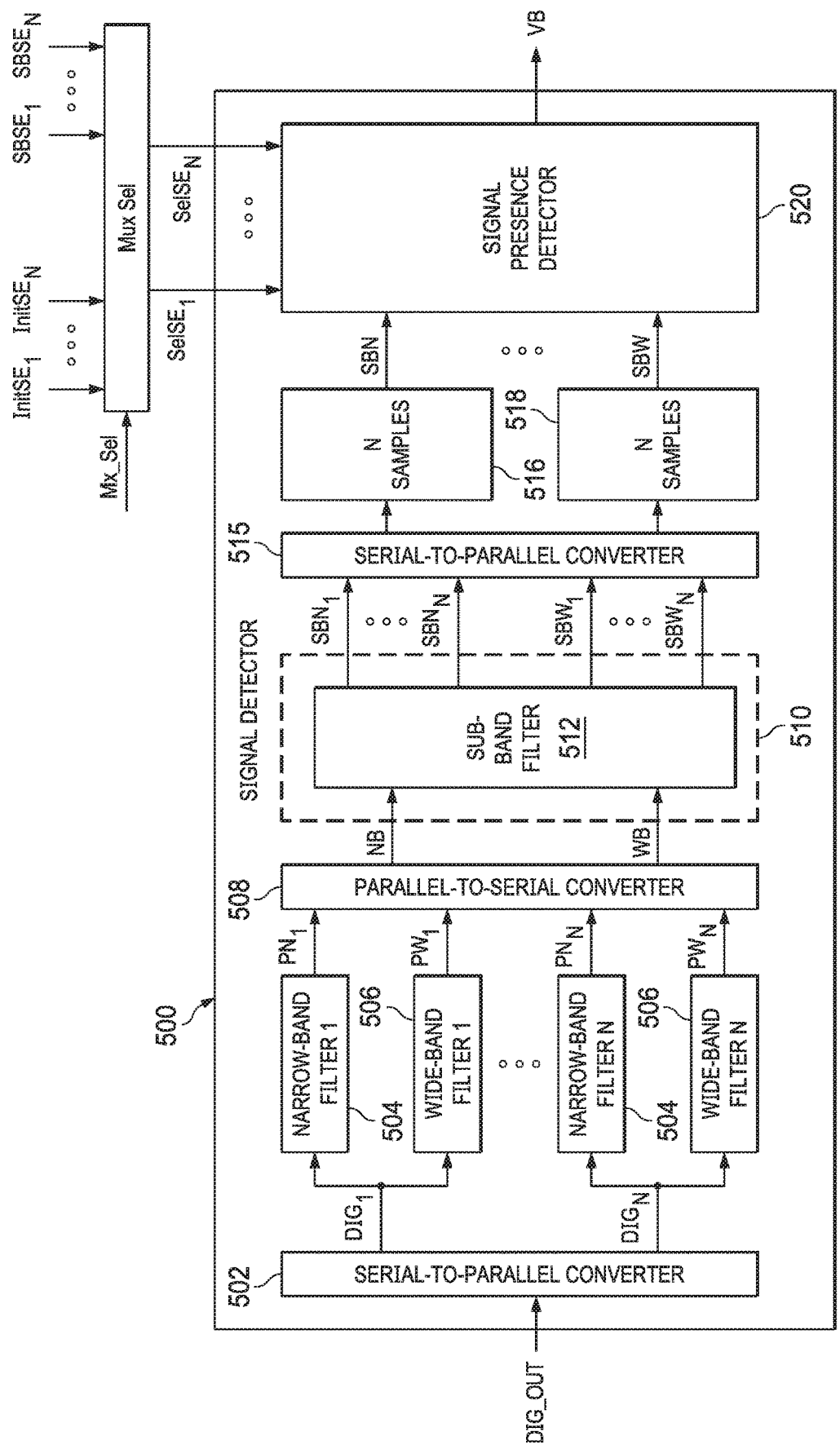
FIG. 5 illustrates another example of a signal detector.

FIG. 5 illustrates an example diagram of a signal detector 500. The signal detector 500 can correspond to the signal detector 404 in the example of FIG. 4. Therefore, reference is to be made to the example of FIG. 4 in the following description of the example of FIG. 5.

The signal detector 500 includes a serial-to-parallel converter 502 that is configured to convert the digital output signal DIG_OUT into the N parallel digital output signal streams, demonstrated in the example of FIG. 5 as signals $DIG_1$ through $DIG_N$. Therefore, each of the digital output signal streams $DIG_1$ through $DIG_N$ can correspond to a separate phase associated with the clock signal CLK. The signal detector 500 also includes a narrow-band filter and wide-band filter pair for each of the respective digital output signal streams $DIG_1$ through $DIG_N$, demonstrated in the example of FIG. 5 as narrow-band filters 504 and wide-band filters 506. Therefore, each sample of each of the digital signal streams $DIG_1$ through $DIG_N$ is filtered by each of a narrow-band filter 504 and a wide-band filter 506. The narrow-band filters 504 are each configured to generate a respective narrow-band portion $PN_1$ through $PN_N$, similar to the narrow-band portion 312 in the example of FIG. 3, and the wide-band filters 506 are each configured to generate a respective wide-band portion $PW_1$ through $PW_N$, similar to the wide-band portion 308 in the example of FIG. 3. For example, the narrow-band filters 504 and the wide-band filters 506 can each be configured as first order IIR filters.

The narrow-band portions $PN_1$ through $PN_N$ and the wide-band portions $PW_1$ through $PW_N$, in aggregate, correspond to a narrow-band and wide-band signal around all $kf_S/N$, k=0, 1, . . . N/2. Therefore, in order to separate the narrow-band portions $PN_1$ through $PN_N$ and the wide-band portions $PW_1$ through $PW_N$, the narrow-band portions $PN_1$ through $PN_N$ and the wide-band portions $PW_1$ through $PW_N$ are each provided to a parallel-to-serial converter 508. The parallel-to-serial converter 508 is configured to provide a first serial stream of the narrow-band portions $PN_1$ through $PN_N$, demonstrated as a signal NB, and a second serial stream of the wide-band portions $PW_1$ through $PW_N$, demonstrated as a signal WB. The signals NB and WB thus each correspond to signals that are low-pass filtered around all $k*F_S/N$ samples.

In the example of FIG. 5, the signals NB and WB are provided to a spur estimate filter 510. The spur estimate filter 510 includes a sub-band filter 512. The sub-band filter 512 can be configured to filter out undesired sub-bands associated with the signals NB and WB to provide for specific sub-bands for determination of a signal. For example, the sub-band filter 512 in the spur estimate filter 510 can each include one or more finite impulse response (FIR) filters. As a result, the sub-band filter 512 can remove the undesired sub-bands from the respective signals NB and WB and pass the remaining respective portions, demonstrated in the example of FIG. 5 as signals SBN and SBW, respectively.

The outputs SBN and SBW of the sub-band filter 512 are provided to a serial-to-parallel converter 514, and the serialized outputs are sampled via respective samplers 516 and 518 to each provide N samples, demonstrated as $S_N$ and $S_W$, respectively, to a signal presence detector 520. Therefore, each corresponding pair of the sub-bands SBN and SBW can be associated with a given respective one of the N samples. The signal presence detector 520 can be configured to determine the presence or absence of a signal. For example, the signal presence detector 520 can operate substantially similarly to the signal presence detector 206 described previously in the example of FIG. 2. For example, the signal presence detector 520 can subtract the narrow-band sample associated with a respective one of the sub-bands SBN from the wide-band sample associated with a respective one of the sub-bands SBW to generate a respective difference sample. The signal presence detector 520 can thus compare the sum of powers of the difference samples with a predetermined threshold (e.g., the signal "THRSH" in the example of FIG. 2). In response to the sum of power of the difference samples being greater than or equal to the predetermined threshold, the signal presence detector 520 can determine that there is a signal present in the respective sub-band. However, in response to the sum of power of the difference samples being less than the predetermined threshold, the signal presence detector 520 can determine that there is no signal present in the respective sub-band.

Additionally, similar to as described previously regarding the example of FIG. 2, the signal presence detector 520 can detect narrow-band signals in the respective sub-band. In the example of FIG. 5, the signal presence detector 520 receives the signals SBN and SBW corresponding to sub-band filtered outputs sampled from the outputs of the sub-band filter 512. As an example, the signals $SBSE_1$ through $SBSE_N$ can correspond to the respective sub-band filtered saved spur estimates and the signals $InitSE_1$ through $InitSE_N$ can correspond to the sub-band filtered initial spur estimates that are obtained during some power up or initial calibration, where it is known that signals are absent and hence can be taken as reliable estimates of spur level at that time. A Mx_Sel signal control a multiplexer (MUX) 522 that selects between the two sets of signals $SBSE_1$ through $SBSE_N$ and $InitSE_1$ through $InitSE_N$ and provides the selected signals as signals $SelSE_1$ to $SelSE_N$ to the signal presence detector 520. The signal presence detector 520 can thus also compare the power of the narrow-band sample associated with the corresponding sub-band SBN with the respective one of the spur estimates $SelSE_1$ through $SelSE_N$. If the sum of the power difference between the respective narrow-band sample (e.g., $SBN_1$ through $SBN_N$) and the respective mux-selected spur estimate $SelSE_1$ through $SelSE_N$ is greater than a second predetermined threshold, then the signal presence detector 520 can determine that there is a signal present in the respective sample. However, if the power difference between the respective narrow-band sample $SBN_1$ through $SBN_N$ and respective mux-selected saved spur estimate $SelSE_1$ through $SelSE_N$ is less than the second predetermined threshold, then the signal presence detector 520 can determine that there is no signal present.

In response to the determination of no signal being present, the signal presence detector 520 can be configured to provide a first state of a validation signal, demonstrated in the example of FIG. 5 as a signal VB. For example, the signal presence detector 520 can assert the validation signal VB to indicate that the respective corresponding set of samples does not include a signal. Additionally, in response to the determination of a signal being present in the respective corresponding set of samples, the signal presence detector 520 can be configured to provide a second state of a validation signal VB to indicate that the respective set of samples includes a signal.

Referring back to the example of FIG. 4, the spur correction system 400 also includes a spur estimate selector 406. The spur estimate selector 406 is configured to select between the current spur estimates $SE_1$ through $SE_N$ or the saved spur estimates $SBSE_1$ through $SBSE_N$ for each of the samples associated with the respective digital output signal streams $DIG_1$ through $DIG_N$. In the example of FIG. 4, the spur estimate selector 406 receives the current spur estimates $SE_1$ through $SE_N$ from the spur estimator 402 and receives the validation signal VB form the signal detector 404 corresponding to the samples $DIG\_OUT_1$ through $DIG\_OUT_N$. Therefore, as an example, in response to determining that a given set of N samples is valid based on the validation signal VB, and therefore does not include a signal, the spur estimate selector 406 can be configured to use the respective current spur estimate $SE_1$ through $SE_N$ to correct the spur of the sample associated with the respective one of the digital output signal streams $DIG_1$ through $DIG_N$. Similarly, in response to determining that a given set of N samples is not valid based on the validation signal VB, and therefore includes a signal, the spur estimate selector 406 can be configured to use the respective saved spur estimate (e.g., corresponding to a respective last valid current spur estimate $SBSE_1$ through $SBSE_N$) to correct the spur of the sample associated with the respective one of the digital output signal streams $DIG_1$ through $DIG_N$.

As another example, the spur estimate selector 406 can include state machines that can be implemented for the evaluation of and correction of a block of sequential samples of the respective digital output signal streams $DIG_1$ through $DIG_N$. For example, the respective state machines can be configured to count a quantity of samples in a given block of sequential samples of the respective digital output signal streams $DIG_1$ through $DIG_N$ that are considered valid based on the validation signal VB. In response to the quantity of samples being equal to or greater than a predetermined threshold of valid samples, the respective spur estimator state machine can determine that the next block of sequential samples of the respective digital output signal streams $DIG_1$ through $DIG_N$ should be corrected based on the respective one of the current spur estimates $SE_1$ through $SE_N$. However, if the quantity of samples is less than the predetermined threshold of valid samples, the respective spur estimator state machine can determine that the next block of sequential samples of the respective digital output signal streams $DIG_1$ through $DIG_N$ should be corrected based on the saved spur estimate, as described in greater detail herein. The spur estimate selector 406 can thus provide spur correction estimates $SC_1$ through $SC_N$ that each correspond to either the respective current spur estimate $SBSE_1$ through $SBSE_N$ or a corresponding saved spur estimate.

Figure 6:
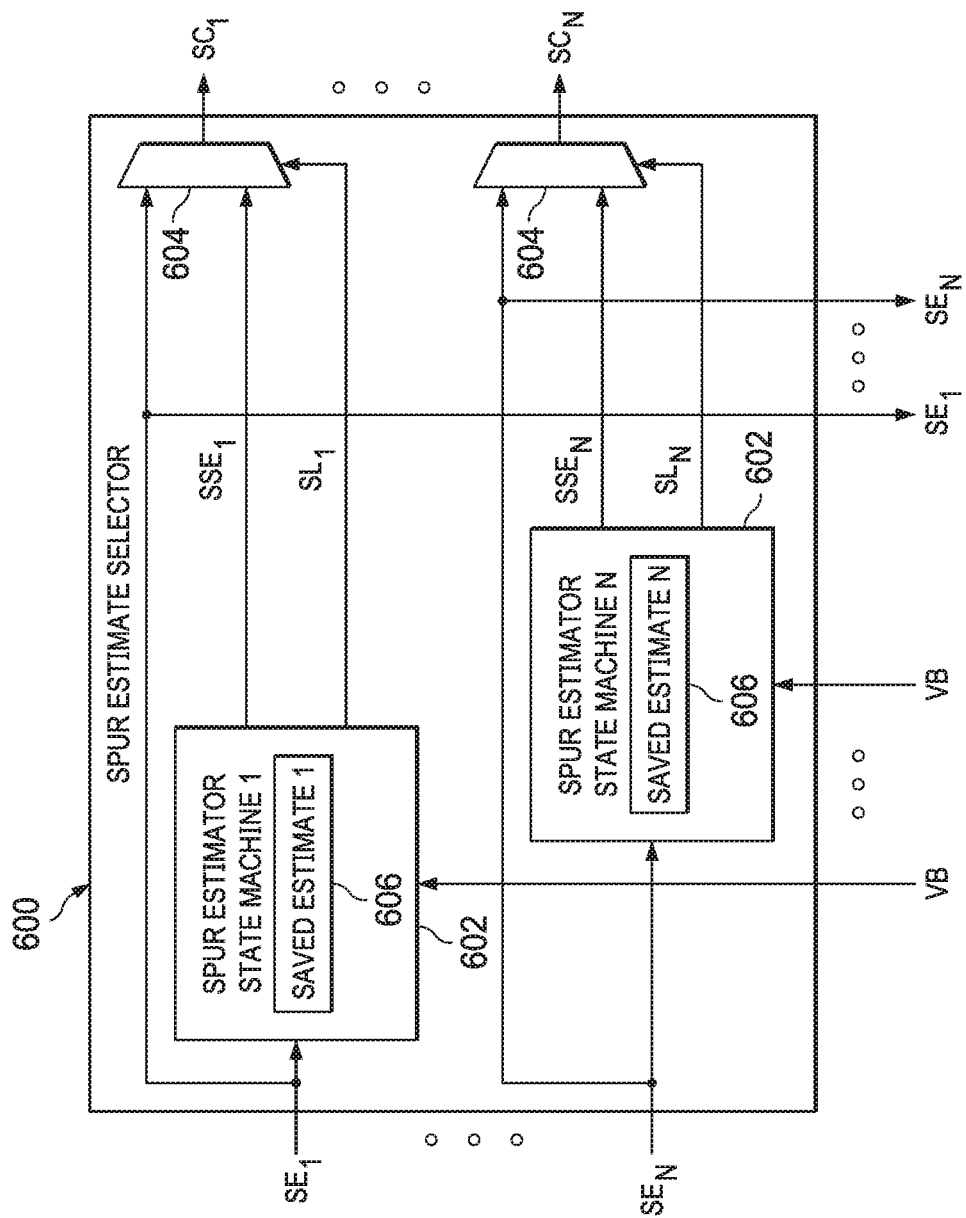
FIG. 6 illustrates an example of a spur estimate selector.

FIG. 6 illustrates an example of a spur estimate selector 600. The spur estimate selector 600 can correspond to the spur estimate selector 406 in the example of FIG. 4. Therefore, reference is to be made to the examples of FIGS. 4 and 5 in the following example of FIG. 6.

The spur estimate selector 600 is configured to receive each of the current spur estimates $SE_1$ through $SE_N$ from the spur estimator 402. In the example of FIG. 6, the spur estimator state machines 602 is configured to store a saved spur estimate 606 in a memory. For example, the spur estimator state machine 602 can be configured as hardware, software, firmware, or a combination thereof. As an example, the selector 604 can be configured as a multiplexer configured to select between two separate spur estimates, as described in greater detail herein.

The spur estimator state machine 602 is configured to evaluate the validation signal VB. As an example, each block of sequential samples can have a predetermined quantity of sequential samples, such that the spur estimator state machine 602 can be configured to count a quantity of the samples in the respective block of sequential samples that are considered a valid sample. If the quantity of valid samples is greater than the predetermined threshold, then the current spur estimate $SE_1$ through $SE_N$ is deemed to be unaffected by signals and so the spur estimator state machine 602 can save the respective current spur estimate $SE_1$ through $SE_N$ (e.g., corresponding to a last sample of the block of sequential samples) as the saved spur estimate 606. The saved spur estimate 606 is also provided from the spur estimator state machine 602 as a signal $SBSE_1$ through $SBSE_N$. The spur estimator state machine 602 can also provide a respective selection signal $SL_1$ through $SL_N$ that can be provided to the respective one of the selectors 604 to provide selection of the spur correction estimate. In the example of FIG. 6, each of the selectors 604 receives both the respective current spur estimate $SE_1$ through $SE_N$ and the respective saved spur estimate $SBSE_1$ through $SBSE_N$. Therefore, the respective selection signal $SL_1$ through $SL_N$ can determine which of the respective current spur estimate $SE_1$ through $SE_N$ and the respective saved spur estimate $SBSE_1$ through $SBSE_N$ is provided as the respective spur correction estimate $SC_1$ through $SC_N$ output from the respective selector 604.

Therefore, in response to the quantity of valid samples being less than the predetermined threshold, the spur estimator state machine 602 can provide the respective selector signal $SL_1$ through $SL_N$ at a first state. As a result, the selector 604 can provide the respective saved spur estimate $SBSE_1$ through $SBSE_N$ as the respective spur correction estimate $SC_1$ through $SC_N$. As an example, the respective selection signal $SL_1$ through $SL_N$ can be provided in the first state through the entirety of the next block of sequential samples, such that each sample of the next block of sequential samples can be corrected based on the saved spur estimate 606. As described previously, the respective saved spur estimate can have been saved based on the last valid set of respective current spur estimates $SE_1$ through $SE_N$. Therefore, the saved spur estimate 606, and thus the respective saved spur estimate $SBSE_1$ through $SBSE_N$, can have a static value throughout the entirety of the next block of sequential samples for correcting the spur of each sample of the respective block of sequential digital samples.

Conversely, in response to the quantity of valid samples greater than or equal to the predetermined threshold, the spur estimator state machine 602 can provide the respective selector signal SL1 through SLN at a second state. As a result, the selector 604 can provide the current spur estimate $SE_1$ through $SE_N$ as the respective spur correction estimate $SC_1$ through $SC_N$. As an example, the respective selection signal $SL_1$ through $SL_N$ can be provided in the second state through the entirety of the next block of sequential samples, such that each sample of the next block of sequential samples can be corrected based on the respective current spur estimate $SE_1$ through $SE_N$. Therefore, the respective current spur estimate $SE_1$ through $SE_N$ of each respective sample can be provided to correct the spur of the respective sample for which the respective current spur estimate $SE_1$ through $SE_N$ was generated by the spur estimator 402 throughout the entirety of the next block of sequential samples for correcting the spur of each sample of the respective block of sequential digital samples.

Referring back to the example of FIG. 4, the spur correction estimates $SC_1$ through $SC_N$ are provided to a combiner 408 that is configured to serialize the spur correction estimates $SC_1$ through $SC_N$. The serialized spur correction estimates are output from the combiner 408 as a signal DIG_C. The serialized spur correction estimates DIG_C are provided, along with the digital output signal DIG_OUT, to a summation component 410. The summation component 410 is therefore configured to correct the spur from the digital output signal DIG_OUT. For example, the summation component 410 is configured to subtract the serialized spur correction estimates DIG_C from the digital output signal DIG_OUT at the appropriate phases of the digital output signal DIG_OUT to provide spur correction to each sample of the digital output signal DIG_OUT. Accordingly, the summation component 410 outputs a digital stream SMPL that corresponds to the digital output signal DIG_OUT having spur corrections.

Based on the operation of the spur correction system 400, as described herein, to detect the presence or absence of the signal in the respective sample, and to correct the spur of the respective sample based on the current spur estimate or a saved spur estimate, the spur correction system 400 can provide a significantly more accurate and efficient spur correction of the output of the ADC 102 in the spur-estimating receiver system 100. For example, typical spur correction systems can implement a notch filter to filter spur from the sample about the notch frequency approximately centered about the frequency band of the respective sample. However, the typical notch filter spur correction methods can distort the signal in the respective sample. Therefore, the spur correction system 400 described herein is more robust to the presence of high spurs and input signals than typical notch filter spur correction methods. Accordingly, as opposed to the typical spur correction systems, the spur correction system 400 described herein can accurately determine the actual spur level and correct the spur from the respective samples.

Figure 7:
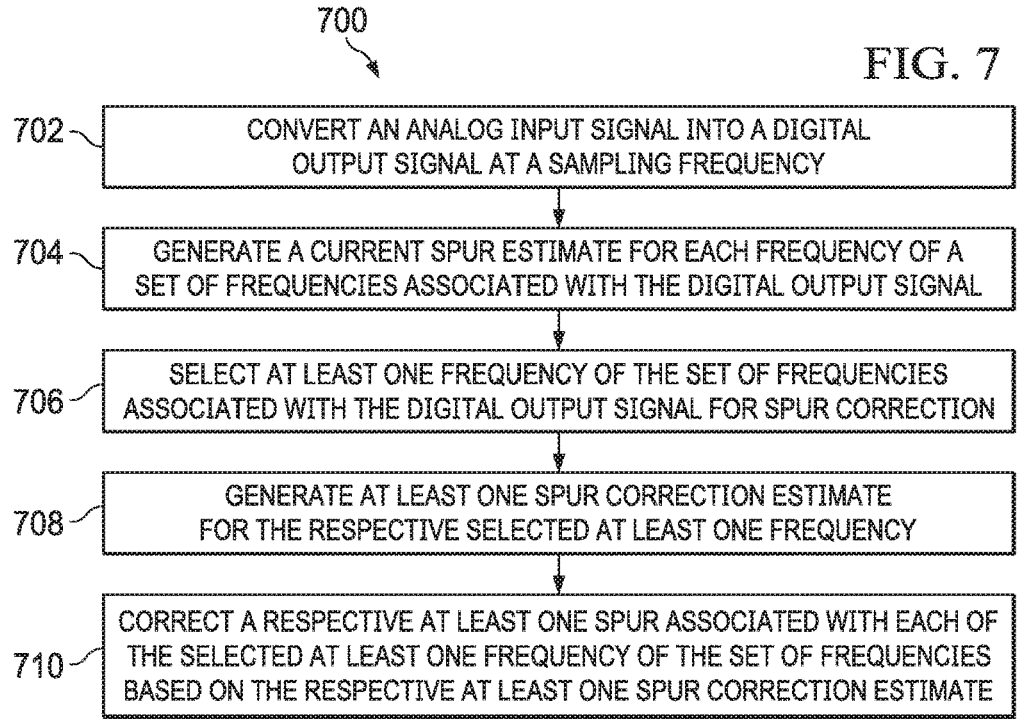
FIG. 7 illustrates an example of a method for estimating a sampling spur in a receiver system.

In view of the foregoing structural and functional features described above, a methodology in accordance with various aspects of the disclosure will be better appreciated with reference to FIG. 7. FIG. 7 illustrates an example of a method 700 for correcting spurs in a sequence of digital samples in a receiver system. It is to be understood and appreciated that the method of FIG. 7 is not limited by the illustrated order, as some aspects could, in accordance with the present disclosure, occur in different orders and/or concurrently with other aspects from that shown and described herein. Moreover, not all illustrated features may be required to implement a methodology in accordance with an aspect of the present examples.

At 702, an analog input signal (e.g., the analog input signal AN_IN) is converted into a digital output signal (e.g., the digital output signal DIG_OUT) at a sampling frequency. At 704, a current spur estimate is generated for each frequency of a set of frequencies associated with the digital output signal. At 706, at least one spur correction estimate is generated for the respective selected at least one frequency of the set of frequencies associated with the digital output signal. At 708, a respective at least one spur associated with each of the selected at least one frequency of the set of frequencies is corrected based on the respective at least one spur correction estimate.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A receiver system comprising:
   an analog-to-digital converter (ADC) configured to convert an analog input signal into a digital output signal at a sampling frequency; and
   a spur correction system configured to receive the digital output signal and to estimate spurs associated with the digital output signal and to selectively correct a subset of the spurs associated with a set of frequencies that are based on the sampling frequency.

2. The system of claim 1, wherein the set of frequencies comprises k*fs/N, "k" corresponds to an index of a respective one of the N interleaved ADCs (k=0, ..., N/2), and "fs" corresponds to the sampling frequency.

3. The system of claim 2, wherein the spur correction system comprises:
   a spur estimator configured to generate a current spur estimate at each frequency of the set of frequencies;
   a signal detector configured to determine whether a signal is present among the selected subset of the set of frequencies; and
   a spur estimate selector configured to save the current spur estimate as a saved spur estimate when a signal is not detected among a block of consecutive samples and to set the spur correction estimate to the respective current spur estimate in response to the signal detector not detecting the presence of the signal among a subset of the set of frequencies, and to set the spur correction estimate to the saved spur estimate in response to the signal detector detecting the presence of the signal among a subset of the set of frequencies.

4. The system of claim 2, wherein the spur correction system comprises:
   a spur estimator configured to generate a current spur estimate at each frequency of the set of frequencies; and
   a spur estimate filter configured to generate the spur correction estimate for each of a selected at least one of the set of frequencies, the spur estimate filter being further configured to correct a respective at least one spur associated with the digital output signal based on the respective spur correction estimate.

5. The system of claim 4, wherein the spur estimator comprises a parallel set of filters that are each associated with a separate phase of the sampling frequency of a clock signal corresponding to the set of frequencies to provide the current spur estimate associated with the respective frequency of the set of frequencies.

6. The system of claim 5, wherein the spur estimate filter is configured to selectively correct the subset of the spurs associated with the set of frequencies.

7. The system of claim 4, wherein the spur correction system further comprises:
a signal detector configured to determine whether a signal is present among the selected subset of the set of frequencies; and
a spur estimate selector configured to save the current spur estimate as a saved spur estimate when a signal is not detected among a block of consecutive samples and to set the spur correction estimate to the respective current spur estimate in response to the signal detector not detecting the presence of the signal among a subset of the set of frequencies, and to set the spur correction estimate to the saved spur estimate in response to the signal detector detecting the presence of the signal among a subset of the set of frequencies.

8. The system of claim 7, wherein the signal detector comprises:
a narrow-band filter configured to filter the frequency band associated with the input signal to generate a narrow-band signal around the set of frequencies;
a wide-band filter configured to filter the frequency band associated with the input signal to generate a wide-band signal around the set of frequencies; and
a signal presence detector configured to determine the presence or absence of the signal in the frequency band based on the wide-band filter output and the narrow-band filter output.

9. The system of claim 8, wherein the signal presence detector is configured to determine a power of a difference between the narrow-band samples and the wide-band samples to determine the presence of the signal in the frequency band associated with the given sample based on the power relative to a predetermined threshold.

10. The system of claim 8, wherein the signal detector comprises:
a serial-to-parallel converter configured to convert the digital output signal into a plurality of parallel digital output signals corresponding to a respective plurality of separate phases of the sampling frequency of a clock signal, wherein the narrow-band filter comprises a plurality of narrow-band filters and the wide-band filter comprises a plurality of wide-band filters, such that the signal presence detector is configured to determine the presence or absence of the signal in the frequency band.

11. The system of claim 10, wherein the signal detector further comprises:
a parallel-to-serial converter configured to convert a plurality of narrow-band filter output samples and a plurality of wide-band filter output samples corresponding to the respective plurality of pairs of narrow-band filters and wide-band filters to a serial set of the plurality of narrow-band filter output samples and the plurality of wide-band filter output samples associated with a sub-band of the frequency band;
a sub-band filter processing the serial set of narrow-band samples and a serial set of wide-band samples to generate sub-band filtered narrow-band and wide-band samples, respectively, to pass signals in sub-bands of interest and to remove spur estimates in undesired sub-bands.

12. A method for correcting spurs in a sequence of digital samples in a receiver system, the method comprising:
converting an analog input signal into a digital output signal at a sampling frequency;
generating a current spur estimate for a set of frequencies associated with the digital output signal;
generating at least one spur correction estimate for at least one frequency of the set of frequencies associated with the digital output signal; and
correcting a respective at least one spur associated with each of the at least one frequency of the set of frequencies based on the respective at least one spur correction estimates;
wherein generating the current spur estimate comprises generating the current spur estimate based on a plurality of parallel filters that are each associated with a separate phase of the sampling frequency associated with a clock signal corresponding to the set of frequencies.

13. The method of claim 12, further comprising:
determining whether a signal is present among the selected subset of the set of frequencies;
saving the spur correction estimates in a memory and setting the spur correction estimate to the current spur estimate in response to a determination that the signal is not present in a consecutive block of samples; and
setting the spur correction estimate to the saved spur estimate in response to a determination that the signal is present in the subset of the set of frequencies.

14. The method of claim 13, wherein determining whether the signal is present comprises:
filtering the frequency band associated with the input signal via a narrow-band filter to generate a narrow-band signal around the set of frequencies;
filtering the frequency band associated with the input signal via a wide-band filter to generate a wide-band signal around the set of frequencies; and
determining the presence or absence of the signal in the frequency band based on the wide-band filter and the narrow-band filter outputs;
determining the presence of absence of the signal in the frequency band based on a power of the narrow-band signal being greater than a scaled value of the power of the saved spur estimate or an initial spur estimate.

15. The method of claim 14, further comprising converting the digital output signal into a plurality of parallel digital output signals corresponding to a respective plurality of separate phases of the sampling frequency of a clock signal, wherein the narrow-band filter comprises a plurality of narrow-band filters and the wide-band filter comprises a plurality of wide-band filters, wherein a respective plurality of pairs of the narrow-band filters and the wide-band filters each correspond to a respective one of the plurality of parallel digital output signals.

16. A receiver system comprising:
an analog-to-digital converter (ADC) configured to convert an analog input signal into a digital output signal at each of a sequence of samples based on a clock signal having a sampling frequency; and
a spur correction system configured to provide a spur correction estimate to correct a spur associated with a given sample of the sequence of samples, the spur correction system comprising:
a spur estimator configured to generate a current spur estimate at each frequency of the set of frequencies;
a spur estimate filter configured to generate the spur correction estimate for each of at least one of the set of frequencies, the spur estimate filter being further configured to correct a respective at least one spur associated with the digital output signal based on the respective spur correction estimate;

a signal detector configured to determine whether a signal is present among the subset of the set of frequencies; and a spur estimate selector configured to save the current spur estimate as a saved spur estimate when a signal is not detected among a block of consecutive samples and to set the spur correction estimate to the respective current spur estimate in response to the signal detector not detecting the presence of the signal among the subset of the set of frequencies, and to set the spur correction estimate to the saved spur estimate in response to the signal detector detecting the presence of the signal among the subset of the set of frequencies.

17. The system of claim 16, wherein the spur estimator comprises a parallel set of filters that are each associated with a separate phase of the sampling frequency of a clock signal.

18. The system of claim 16, wherein the signal detector comprises:

a narrow-band filter configured to filter the frequency band associated with the input signal to generate a narrow-band signal around the set of frequencies;

a wide-band filter configured to filter the frequency band associated with the input signal to generate a wide-band signal around the set of frequencies; and a signal presence detector configured to determine the presence or absence of the signal in the frequency band based on the wide-band filter output relative to the narrow-band filter output.

19. The system of claim 18, wherein the signal presence detector is configured to determine a power of a difference between the narrow-band filter output samples and the wide-band filter output samples to determine the presence of the signal in the frequency band associated with the given sample if the difference power is greater than a predetermined threshold or based on the narrow-band sample power being greater than a scaled value of the power of the saved spur estimate or an initial spur estimate.

* * * * *